(12) United States Patent
Cheng et al.

(10) Patent No.: US 12,400,301 B2
(45) Date of Patent: Aug. 26, 2025

(54) IMAGE GENERATION METHOD AND APPARATUS, DEVICE, AND STORAGE MEDIUM

(71) Applicants: SENSETIME GROUP LIMITED, Hong Kong (CN); HONDA MOTOR CO., LTD., Tokyo (JP)

(72) Inventors: Guangliang Cheng, Hong Kong (CN); Jianping Shi, Hong Kong (CN); Yuji Yasui, Tokyo (JP); Hideki Matsunaga, Tokyo (JP); Kaname Tomite, Tokyo (JP)

(73) Assignees: SENSETIME GROUP LIMITED, Hong Kong (CN); HONDA MOTOR CO., LTD., Tokyo (JP)

( * ) Notice: Subject to any disclaimer, the term of this patent is extended or adjusted under 35 U.S.C. 154(b) by 136 days.

(21) Appl. No.: 18/472,702

(22) Filed: Sep. 22, 2023

(65) Prior Publication Data
US 2024/0013348 A1   Jan. 11, 2024

Related U.S. Application Data

(63) Continuation of application No. PCT/CN2022/074085, filed on Jan. 26, 2022.

(30) Foreign Application Priority Data

Mar. 31, 2021   (CN) .......................... 202110351897.2

(51) Int. Cl.
    *G06T 5/70*    (2024.01)
    *G06T 3/40*    (2006.01)
    *G06T 7/00*    (2017.01)
(52) U.S. Cl.
    CPC ................. *G06T 5/70* (2024.01); *G06T 3/40* (2013.01); *G06T 7/0002* (2013.01)

(58) Field of Classification Search
    CPC ... G06T 5/70; G06T 3/40; G06T 2207/10024; G06T 7/90; G06T 7/0002; G06T 5/77; G06T 3/04
    See application file for complete search history.

(56) References Cited

U.S. PATENT DOCUMENTS 10,157,332 B1 * 12/2018 Gray ....................... G06T 11/00
2015/0002672 A1    1/2015 Hayakawa et al.
(Continued)

FOREIGN PATENT DOCUMENTS

CN          102360490 A      2/2012
CN          108122276 A      6/2018
(Continued)

OTHER PUBLICATIONS

Notice of Allowance of the Japanese application No. 2023-559731, issued on Jul. 16, 2024, 6 pages with English translation.
(Continued)

*Primary Examiner* — Phi Hoang
(74) *Attorney, Agent, or Firm* — Syncoda LLC; Feng Ma

(57) ABSTRACT

An image generation method includes the following steps. Illumination lamps on a target object in an original image are detected; the original image is converted into an image to be processed that is in a specific scene; in the image to be processed, at least one illumination lamp of which operation state does not match scene information of the specific scene is determined as an object to be replaced; a replacement image including the object to be replaced of which operation state matches the scene information is determined according to the scene information and the object to be replaced; and the image in a region occupied by the object to be replaced in the image to be processed is replaced with the replacement image to generate a target image.

20 Claims, 9 Drawing Sheets

(56) References Cited

U.S. PATENT DOCUMENTS

| | | | |
|---|---|---|---|
| 2017/0161938 A1* | 6/2017 | Imber | G06T 7/49 |
| 2017/0244908 A1 | 8/2017 | Flack | |
| 2018/0247201 A1* | 8/2018 | Liu | G06T 1/00 |
| 2020/0020102 A1* | 1/2020 | Dai | G06N 3/04 |
| 2021/0019453 A1* | 1/2021 | Yang | G06N 3/045 |
| 2021/0027083 A1* | 1/2021 | Cohen | G06V 10/255 |
| 2021/0042950 A1* | 2/2021 | Wantland | G06T 19/006 |
| 2021/0150681 A1* | 5/2021 | Sytnik | G06T 5/92 |
| 2021/0295571 A1* | 9/2021 | Sun | G06T 5/94 |
| 2022/0101577 A1* | 3/2022 | Chakrabarty | G06T 7/11 |
| 2022/0284078 A1* | 9/2022 | Jakkula | G06F 21/554 |
| 2023/0206568 A1* | 6/2023 | Du | G06T 7/50 |
| | | | 345/426 |

FOREIGN PATENT DOCUMENTS

| | | |
|---|---|---|
| CN | 110418095 A | 11/2019 |
| CN | 111738968 A | 10/2020 |
| CN | 111951157 A | 11/2020 |
| CN | 112348737 A | 2/2021 |
| CN | 113096000 A | 7/2021 |
| JP | 2010246166 A | 10/2010 |
| WO | 2020039838 A1 | 2/2020 |
| WO | 2020220807 A1 | 11/2020 |

OTHER PUBLICATIONS

International Search Report in the international application No. PCT/CN2022/074085, mailed on Mar. 29, 2022, 7 pages with English translation.
Written Opinion of the International Search Authority in the international application No. PCT/CN2022/074085, mailed on Mar. 29, 2022, 10 pages with English translation.

* cited by examiner

IMAGE GENERATION METHOD AND APPARATUS, DEVICE, AND STORAGE MEDIUM

CROSS-REFERENCE TO RELATED APPLICATIONS

This is a continuation of International Patent Application No. PCT/CN2022/074085 filed on Jan. 26, 2022, which claims priority to Chinese Patent Application No. 202110351897.2 filed on Mar. 31, 2021. The disclosures of the above-referenced applications are hereby incorporated by reference in their entirety.

BACKGROUND

In an image generation method in some implementations, when an image of an automatic driving scene in daytime is required to be converted into an image of the scene at night in a manner of image generation, since tail lamps in the converted image do not turn on, the authenticity of the generated image is not high.

SUMMARY

The disclosure relates to the field of intelligent drive technologies, and further relates to, but is not limited to, a method and an apparatus of image generation, a device and a storage medium.

In view of this, embodiments of the disclosure provide an image generation technical solution. The technical solutions of the embodiments of the disclosure are implemented by means of the following operations.

The embodiments of the disclosure provide a method of image generation. The method includes: detecting illumination lamps on a target object in an original image; converting the original image into an image to be processed that is under a specific scene; determining, in the image to be processed, at least one illumination lamp of which operation state does not match scene information of the specific scene as an object to be replaced; determining, according to the scene information and the object to be replaced, a replacement image including the object to be replaced of which operation state matches the scene information; and replacing an image of a region occupied by the object to be replaced in the image to be processed with the replacement image, to generate a target image.

The embodiments of the disclosure provide an apparatus of image generation. The apparatus includes: an illumination lamp detection module, configured to detect illumination lamps on a target object in an original image; an image conversion module, configured to convert the original image into an image to be processed that is under a specific scene; an object determination module, configured to determine, in the image to be processed, at least one illumination lamp of which operation state does not match scene information of the specific scene as an object to be replaced; a replacement image determination module, configured to determine, according to the scene information and the object to be replaced, a replacement image including the object to be replaced of which operation state matches the scene information; and an image generation module, configured to replace an image of a region occupied by the object to be replaced in the image to be processed with the replacement image to generate a target image.

The embodiments of the disclosure provide a computer storage medium. The computer storage medium stores a computer executable instruction that, when being executed, enables to implement the method of image generation as described above.

The embodiments of the disclosure provide an electronic device. The electronic device includes a memory and a processor. The memory stores a computer executable instruction. The processor implements the computer executable instruction stored on the memory to implement the method of image generation as described above.

The embodiments of the disclosure provide a computer program. The computer program includes a computer-readable code. When the computer-readable code runs in an electronic device, a processor in the electronic device implements the method of image generation described in any one of the above.

BRIEF DESCRIPTION OF THE DRAWINGS

Drawings are incorporated into the specification and constitute a part of the specification. The drawings illustrate embodiments in accordance with the embodiments of the disclosure and serve to describe the technical solutions of the embodiments of the disclosure together with the specification.

DETAILED DESCRIPTION

Figure 1A:
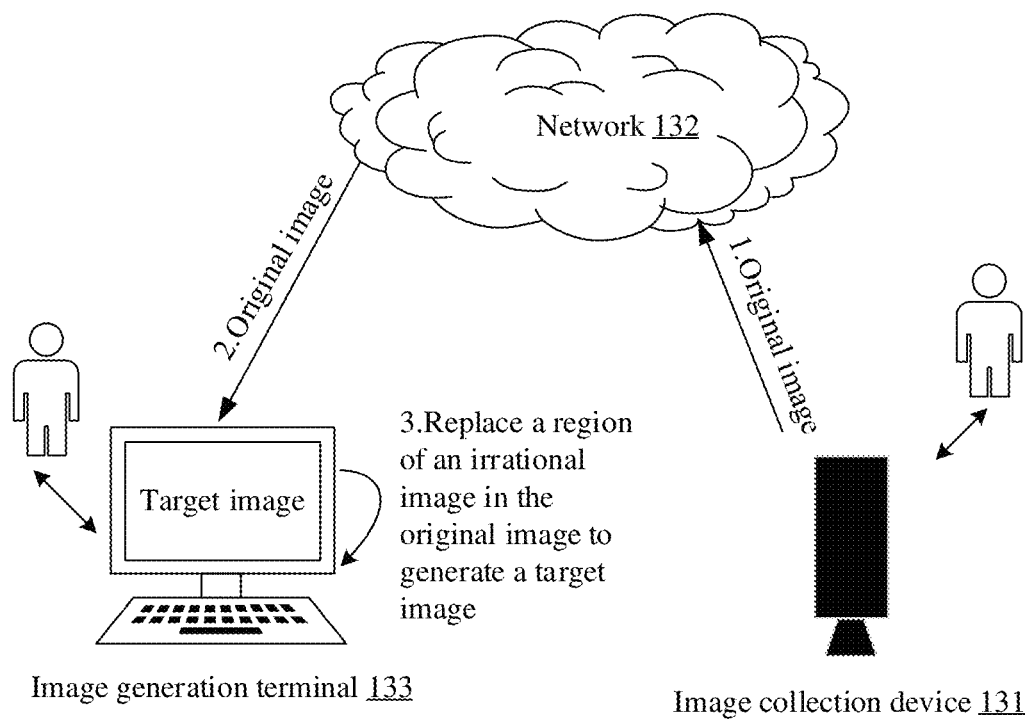
FIG. 1A is a schematic diagram of a system architecture of an image generation method according to an embodiment of the disclosure.

In order to make objectives, technical solutions, and advantages of the embodiments of the disclosure clearer, the specific technical solutions of the present disclosure are further described in detail below with reference to the drawings in the embodiments of the disclosure. The following embodiments are used to illustrate the disclosure, but not to limit the scope of the disclosure.

"Some embodiments" involved in the following descriptions describes a subset of all possible embodiments. However, it can be understood that "some embodiments" may be the same subset or different subsets of all the possible embodiments, and may be combined without conflicts.

Term "first/second/third" involved is only for distinguishing similar objects and does not represent a specific sequence for the objects. It can be understood that "first/second/third", if allowed, may be interchanged to specific sequences or orders to implement the embodiments of the disclosure described in some embodiments in sequences except the illustrated or described ones in some embodiments.

Unless otherwise defined, all technical and scientific terms in the specification have the same meaning as that usually understood by those skilled in the art in the present disclosure. Terms used in the specification are only used for describing the purpose of the present disclosure, but not intended to limit the present disclosure.

Before the embodiments of the disclosure are further described in detail, the phrases and terms involved in the embodiments of the disclosure are described, and the phrases and terms involved in the embodiments of the disclosure are suitable for the following explanations.

1) Gaussian Blur, which is a low-pass filter for an image. The so-called "blur" may be understood as taking an average value of surrounding pixels for each pixel.

2) Ego vehicle, which is a vehicle including sensor(s) for sensing ambient environment. A vehicle coordinate system is fixed at or fastens the ego vehicle, where an x axis is a forward direction of a vehicle, y axis points to the left side of the forward direction of the vehicle, and z axis is perpendicular to the ground upwards, conforming to a right-hand coordinate system. The origin of the coordinate system is on the ground below the midpoint of a rear axle.

The exemplary application of an image generation device provided in an embodiment of the disclosure is described below. The device provided in the embodiment of the disclosure may be implemented as various types of user terminals such as a notebook computer, a tablet computer, a desktop computer, a camera, or a mobile device (for example, a personal digital assistant, a special message device, and a portable game device) having image collection functions, or may be implemented as a server. The exemplary application is described below when the device is implemented as a terminal or a server.

The method is applicable to a computer device. Functions achieved by the method may be implemented by using a program code invoked by a processor in the computer device. The program code may be stored in a computer storage medium, and it can be seen that the computer device includes at least the processor and the storage medium.

FIG. 1A is a schematic diagram of a system architecture of an image generation method according to an embodiment of the disclosure. As shown in FIG. 1A, the system architecture includes an image collection device 131, a network 132 and an image generation terminal 133. In order to support the exemplary application, the image collection device 131 may be communicatively connected to the image generation terminal 133 by means of the network 202. The image collection device 131 reports the collected original image to the image generation terminal 133 by means of the network 132 (or, the image generation terminal 133 automatically acquires the collected original image of an image collection device 131. In response to the received original image, the image generation terminal 133 first detects illumination lamps in the original image and converts the original image into an image to be processed that is under a certain scene, then finds at least one illumination lamp of which operation state is irrational in the image to be processed, and finally using a replacement image of which operation state matches the scene information to replace an image region corresponding to the irrational illumination lamp, so as to generate a target image, and the target image is outputted on an image display interface of the image generation terminal 133. In this way, the operation state of an object in the target image matches the scene information, so that the generated target image can be more in line with a real scene.

As an example, the image collection device 131 may be a collection device including camera(s). The image generation terminal 133 may include a computer device with certain computing power. The computer device includes, for example, a terminal device, a server, or other processing devices. The network 132 may use a wired or wireless connection mode. When the image generation terminal 133 is the server, the image collection device 131 may be communicatively connected to the server in a wired manner, for example, achieving data communication by using a bus. When the image generation terminal 133 is the terminal device, the image collection device 131 may be communicatively connected to the image generation terminal 133 by means of a wireless connection mode for data communication.

Alternatively, in some scenes, the image generation terminal 133 may be a visual processing device having a video capture module, or may be a host having camera(s). In this case, the image generation method in the embodiment of the present disclosure may be performed by the image generation terminal 133, and the system architecture may not include the network 132 and the image collection device 131.

Figure 1B:
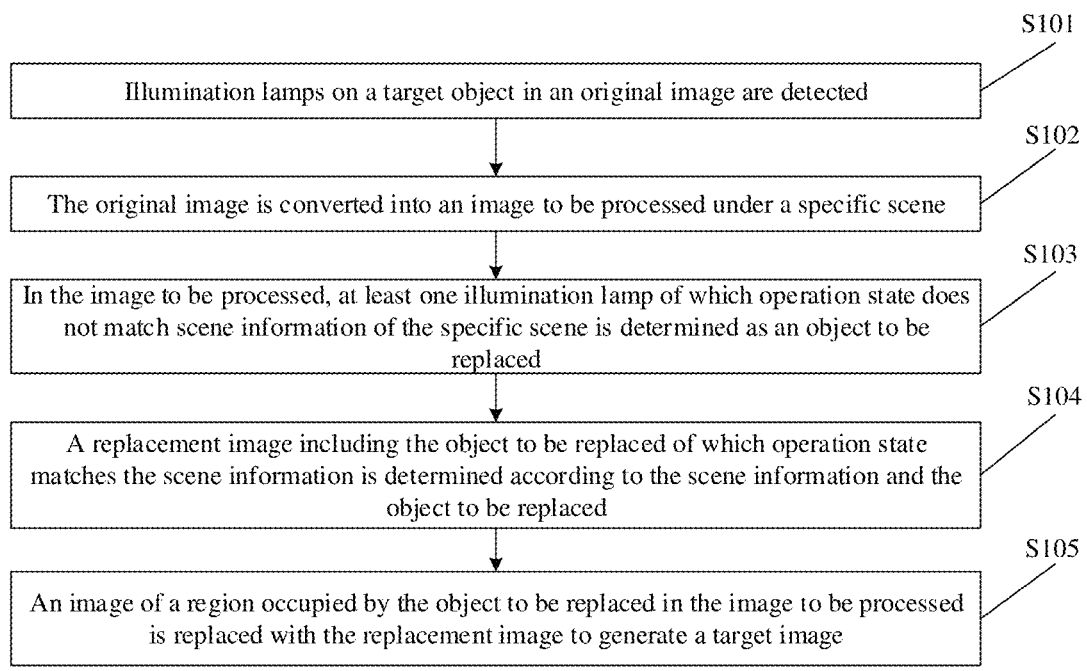
FIG. 1B is a schematic flowchart of implementation of an image generation method according to an embodiment of the disclosure.

FIG. 1B is a schematic flowchart of implementation of an image generation method according to an embodiment of the disclosure. As shown in FIG. 1B, description is performed with reference to steps shown in FIG. 1B.

At S101, illumination lamps on a target object in an original image are detected.

In some embodiments, the original image may be an image collected under any scene, and the original image may be an image including complex picture content, or may be an image including simple picture content, for example, a street scene image collected late at night, or a street scene image collected in daytime. The target object is an object having illumination lamps, such as a vehicle or a street light. The target object includes a device with a changeable operation state such as a traveling device and the street light. The device with the changeable operation state includes a mobile device having at least two operation states, for example, vehicles with various functions (such as a truck, an automobile, a motorbike, or a bicycle), vehicles with different number of wheels (such as a four-wheel vehicle or a two-wheel vehicle), and any mobile device (such as a robot, an aircraft, a blind guide, a smart furniture device, or a smart toy); or a fixed device having at least two operation states, for example, various road lamps (such as a high pole street lamp, a medium pole lamp, a road lamp, a garden lamp, a lawn lamp, or a landscape lamp). Description is made below by using a vehicle as an example. For example, the image to be processed is a road image under a night scene. The device with changeable operation state is illumination lamps on a vehicle traveling on the road.

At S102, the original image is converted into an image to be processed that is under a specific scene.

In some embodiments, scene information of the specific scene may include a light intensity of light in the scene, a position where the scene is located, and an object (or objects) in the scene. For example, the image to be processed is a street image under a late night scene, and then the scene information includes a light intensity of the street, a position of the street, and objects on the street such as vehicles and street lamps.

In some possible implementations, the image to be processed may be an image under the specific scene. The specific scene may be any set scene, for example, the late night scene, an evening scene, or an early morning scene.

The operation of converting the original image into the image to be processed under the specific scene in S102 may be implemented by means of the following steps.

At a first step, the original image is acquired.

In some possible implementations, the original image is an image collected under any scene, for example, a road image collected at the daytime or a road image collected at night.

At a second step, the scene information of the original image is determined.

In some possible implementations, after the original image is acquired, whether the scene information of the original image is the scene information of the specific scene is determined by using a trained discriminator. For example, if the scene information of the specific scene is the night scene, whether the scene information of the image is the night scene is determined by using the discriminator.

At a third step, when the scene information of the original image does not match the scene information of the specific scene, the scene information of the original image is converted according to the scene information of the specific scene, to obtain a conversion image.

In some possible implementations, when the scene information of the original image is obviously different from the scene information of the specific scene, the scene information of the original image is converted into the scene information of the specific scene. That is to say, the original image is converted into the image under the specific scene, so as to obtain the conversion image. For example, if the scene information of the specific scene is the night scene and the original image is an image collected under a daytime scene, the original image collected under the daytime scene is converted into an image of the night scene, so that a corresponding night image to be processed may be generated by inputting the original image into a generator.

In some embodiments, when the scene information of the original image matches the scene information of the specific scene, the original image is determined as the image to be processed.

For example, when the scene information of the original image is the same or very similar to the scene information of the specific scene, it indicates that the original image has the scene information of the specific scene, and thus the original image may be used as the image to be processed without performing image conversion on the original image. In a specific example, if the scene information of the specific scene is the late night scene, the original image is an image collected under a nightfall scene. The scene and the specific scene are similar, which both are at night, and then the original image is determined as the image to be processed.

At a fourth step, the conversion image is determined as the image to be processed.

By means of the first step to the fourth step above, after the original image is acquired, the scene information of the original image is determined. When the scene information of the original image is not the scene information of the specific scene, the scene information of the original image is converted, so that the image to be processed having the scene information of the specific scene is obtained.

At S103, in the image to be processed, at least one illumination lamp of which operation state does not match scene information of the specific scene is determined as an object to be replaced.

In some embodiments, the operation state of the illumination lamp is associated with the scene information of the specific scene, and it may be understood that the operation state of the illumination lamp should vary with the scene information of the specific scene. For example, if the scene information of the specific scene is converted from the daytime scene to the night scene, the operation state of the illumination lamp is changed accordingly. In a specific example, if the image to be processed is a road image under the night scene, the illumination lamp is at least one car light of a traveling vehicle in the road image. In real situations, the illumination lamp (for example, tail lamps) of the vehicle at the night scene should be in an illuminated state. If the car lights in the image to be processed are in an unilluminated state, the car light(s) of the vehicle is determined as the object to be replaced. However, the car lights of the vehicle under the daytime scene should be in the unilluminated state. If the car light(s) in the image to be processed is in the illuminated state, the car light(s) of the vehicle is determined as the object to be replaced. Alternatively, if the object to be replaced is a street lamp, in an actual scene, the street lamps under the night scene should be in the illuminated state, and the street lamps under the daytime scene should be in the unilluminated state.

In other embodiments, the entire target object, in the image to be processed, including at least one illumination lamp of which operation state does not match the scene information of the specific scene may be used as the object to be replaced. For example, if the scene information of the specific scene corresponds to the night scene, the target object is at least one vehicle, and the vehicle includes the car lights in the unilluminated state, the vehicle may be used as the object to be replaced.

At S104, a replacement image including the object to be replaced of which operation state matches the scene information is determined according to the scene information and the object to be replaced.

In some embodiments, the operation state of the object to be replaced included in the replacement image matches the scene information, that is, the operation state of the illumination lamp included in the replacement image matches the scene information. The operation state of the object to be replaced in the image to be processed does not match the scene information, which may be understood that the operation state of the object to be replaced is not a rational state under the scene. For example, if the scene information is the night scene, the object to be replaced is the car light(s), and the operation state of the object to be replaced is the unilluminated state, it indicates that the operation state of the object to be replaced does not match the scene information.

The operation state of the object to be replaced in the image to be processed matches the scene information, which may be understood that the operation state of the object to be replaced in the replacement image is a rational state under the scene. For example, if the scene information is the night scene and the object to be replaced is the car light(s), then the operation state of the object to be replaced in the replacement image is the illuminated state, and correspondingly, the replacement image is the collected image of the car light(s) in the illuminated state.

At S105, an image of a region occupied by the object to be replaced in the image to be processed is replaced with the replacement image to generate a target image.

In some embodiments, the object to be replaced of which operation state does not match the scene information is determined in the image to be processed, a region occupied by the object to be replaced in the image to be processed is determined, the image for the region is replaced with the replacement image corresponding to the object to be replaced of which operation state matches the scene information, and the replaced image is smoothed, so that the target image is generated.

In a specific example, by using the scene information being the night scene as an example, the image to be processed is a road image having the night scene, and the illumination lamp of which operation state varies with the scene is the car light(s) in the vehicle. When the operation state of the car light(s) is the unilluminated state, that is, the operation state does not match the night scene, in this case, the replacement image including a preset car light(s) of which specification is the same as that of the car light(s) is searched for in the preset image library according to the specification of the car light(s). The operation state of the object to be replaced in the replacement image matches the scene, that is, the operation state of the preset car light in the replacement image is the illuminated state. Finally, the replacement image is used to replace the image of the region where the car light(s) is located in the image to be processed, so that the target image is generated. In this way, the operation state of the car light(s) in the generated target image is the illuminated state, which matches the night scene, so that the generated target image can be more realistic.

In the embodiments of the disclosure, by means of determining, in the image to be processed, the object to be replaced of which operation state does not match the scene information, and then using the replacement image to replace the image of the region occupied by the object to be replaced, the generated target image includes the object to be replaced of which operation state matches the scene information, so that the generated target image can be more vivid and realistic.

In other embodiments, the replacement image including the object to be replaced of which operation state matches the scene information is stored in the preset image library, and may be used to render the object to be replaced in real time, so that the target image for animation playback may be generated, and thus the richness of the generated target image can be improved. An implementation process includes the following, and is described by using the object to be replaced being the car light as an example in the embodiments of the disclosure.

First, an operation mode of the object to be replaced is determined.

In some possible implementations, the car light refers to illumination lamp on the vehicle, which may be a headlight, a fog light, a backup light, a license plate light, or the like. The operation mode of the car light includes at least a flash mode, a high beam mode, and a low beam mode.

If the operation mode is a preset operation mode, a plurality of target preset images that include objects matching the object to be replaced and vary with time sequences according to the preset operation mode are searched in the preset image library, so as to obtain a set of target preset images.

In some possible implementations, the preset operation mode may be set to the flash mode. That is to say, if the operation mode is the flash mode, the plurality of target preset images varying with the time sequence during the flashing of the car light are determined in the preset image library, so as to obtain the set of target preset images.

Finally, according to the plurality of target preset images varying with the time sequence, the current object to be replaced is rendered in real time to generate a target animation of the object to be replaced in the preset operation mode, and the generated target animation is played in an animation format.

In an embodiment of the disclosure, for the object to be replaced, since Light Emitting Diodes (LED) are replace with lights, the car lights may emit light with various colors and operate by means of a plurality of light emitting modes, for example, operating in the flash mode. In this case, according to the embodiment of the disclosure, not only the still target image can be outputted, but also the target image in the animation format may be used. Since the replacement image including the object to be replaced of which operation state matches the scene information is stored in the preset image library, the object to be replaced can be rendered by means of the preset image varying with the time sequence, so as to generate and play the target animation.

In some embodiments, in order to enhance the accuracy of determining the object to be replaced, a target object is determined in the image to be processed, and the art least one illumination lamp of which operation state does not match the scene information in the target object is used as the object to be replaced. This may be implemented by the following steps.

At a first step, the illumination lamp with changeable operation state in the image to be processed is determined.

In some possible implementations, the illumination lamp of which operation state is associated with the scene information is determined in the target object in the image to be processed. Although the operation state of the illumination lamp is associated with the scene information, the operation state does not necessarily match the scene information.

At a second step, the illumination lamp of which operation state does not match the scene information is determined as the object to be replaced.

In some possible implementations, if the target object is a mobile device, the object to be replaced is the illumination lamp(s) in the mobile device of which operation state does not match the scene information. For example, if the target object is a vehicle, the object to be replaced is the car lights (for example, the head lights, the front lamps, or the tail lamps) in the vehicle of which operation state does not match the scene information. If the target object is a fixed device, the object to be replaced is the illumination lamp(s) in the fixed device of which operation state does not match the scene information. For example, if the target object is a high pole street lamp, the object to be replaced is one or more lamps in the high pole street lamps of which operation state does not match the scene information. The target object may also be a fixed lighting device. Illumination lamp(s) in the fixed lighting device of which operation state does not match the scene information is the illumination lamps, that is, the object to be replaced is the illumination lamps on the fixed lighting device. In the image to be processed, the operation state of the illumination lamp(s) may be illuminated or unilluminated. That is to say, the illumination lamp(s) in the image to be processed may turn on, or may not turn on.

In some possible implementations, for example, the fixed lighting device is a high pole street lamp, and the object to be replaced is the lamp of the high pole street lamp. If the scene information of the image to be processed is the daytime scene, for example, the image to be processed is the image of the daytime scene obtained after scene conversion is performed on the original image under the street scene that is collected at night. Assuming that the street lamp on the street in the original image does not work, and the image to be processed is the image under the daytime scene after image conversion, the street lamp is certainly not required to be in the light-on state, so that in this case, the street lamp on the image to be processed is not required to be replaced. If the scene information of the image to be processed is the night scene, for example, the image to be processed is the image at the night scene obtained after scene conversion is performed on the original image under the street scene that is collected at the daytime. Assuming that the street lamp on the street in the original image does not work, and the image to be processed is the image at the night scene after image conversion, the street lamp is required to be in the light-on state, so that in this case, the replacement image including the street lamp in the light-on state is required to be determined. The image of the region occupied by the object to be replaced in the image to be processed is replaced with the replacement image to generate the target image.

In some possible implementations, the target object may also be a traveling device. Illumination lamp(s) in the traveling device of which operation state does not match the scene information is the illumination lamp(s) of the traveling device, for example, if the traveling device is a vehicle, the object to be replaced is at least one car light. In the image to be processed, the operation state of the car light on the vehicle may be illuminated or unilluminated. That is to say, the car light in the image to be processed may turn on, or may not turn on. For example, the traveling device is the vehicle, and the object to be replaced is the tail lamps. If the scene information of the image to be processed is the daytime scene, for example, the image to be processed is an image under the daytime scene that is obtained after scene conversion is performed on the original image under the street scene collected at night. Assuming that the headlights of the vehicle on the street in the original image do not work, and the image to be processed is the image under the daytime scene after image conversion, the headlights are not required to be in the light-on state, so that in this case, the headlights on the image to be processed are not required to be replaced. If the scene information of the image to be processed is the night scene, for example, the image to be processed is an image under the night scene that is obtained after scene conversion is performed on the original image under the street scene collected at the daytime. Assuming that the headlights on the street in the original image do not work, and the image to be processed is the image under the night scene after image conversion, the headlights are required to be in the light-on state, so that in this case, the replacement image including the headlights in the light-on state is required to be determined. The region occupied by the object to be replaced in the image to be processed is replaced with the replacement image to generate the target image.

In the embodiment of the disclosure, by means of determining the target object having a plurality of operation states in the image to be processed, and replacing the at least one illumination lamp in the target object of which operation state does not match the scene information, the replaced target image can better match the scene information, and picture content is more rational and vivid.

In some embodiments, an image to be replaced may be searched for from the preset image library, or may be generated by analyzing the attribute information of the object to be replaced. That is to say, in S104, the image to be replaced may be determined by means of the following two manners.

First manner: the replacement image including a preset object matching the object to be replaced is searched for in the preset image library.

In some embodiments, an operation state of the preset object stored in the preset image library matches the scene information. For example, if the scene information is the night scene, the preset image library stores the car light image in the illuminated state. The target preset image matching the object to be replaced may be understood as a target preset image of which at least specification or type is the same as that of the object to be replaced. For example, if the object to be replaced is the car light, the target preset image is the car light image with the same specification as the car light.

Figure 2:
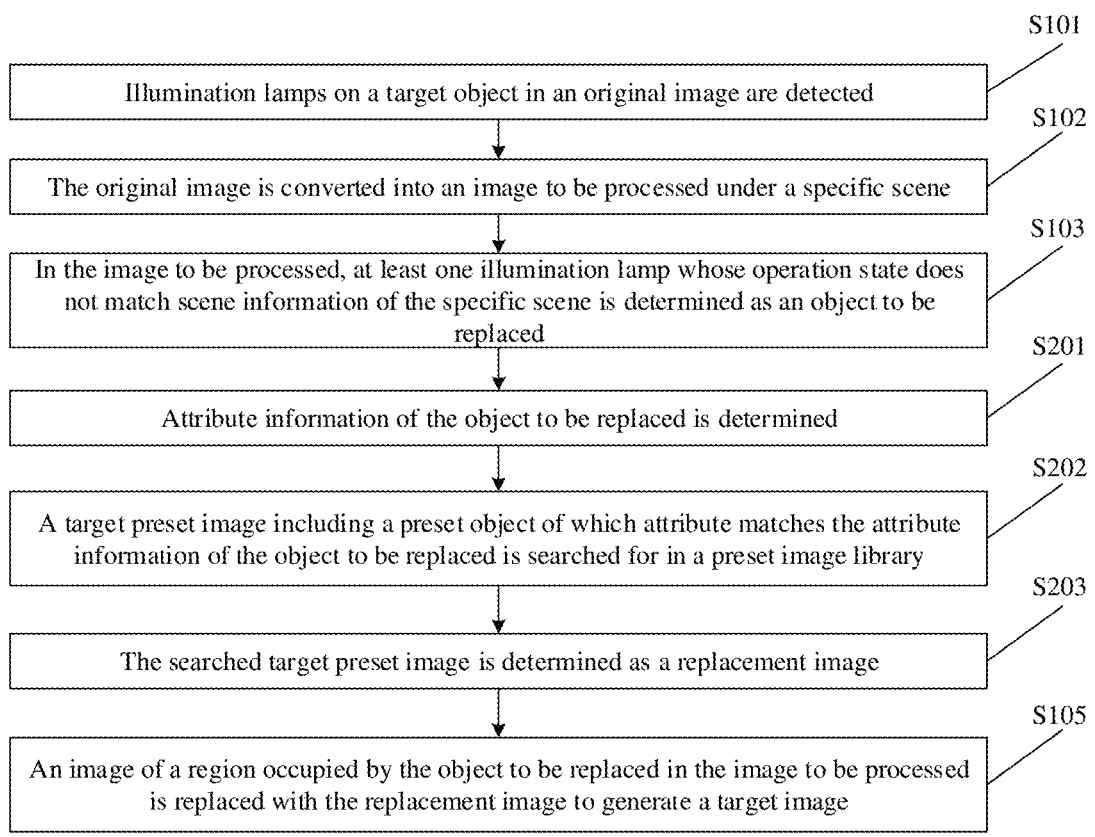
FIG. 2 is another schematic flowchart of implementation of an image generation method according to an embodiment of the disclosure.

In some possible implementations, the replacement image may be searched in the preset image library by means of the following processes. As shown in FIG. 2, FIG. 2 is another schematic flowchart of implementation of an image generation method according to an embodiment of the disclosure. S104 may be implemented by S201 to S203, which is described with reference to steps shown in FIG. 2.

At S201, attribute information of the object to be replaced is determined.

In some possible implementations, the replacement image may be searched with the help of a trained second neural network, so as to enhance the accuracy of determining the replacement image. That is, the attribute information of the object to be replaced is determined by means of the second neural network. The attribute information of the object to be replaced is used for characterizing the specification and type of the object to be replaced, and describing information of the object to be replaced itself. For example, the object to be replaced is a car light, and the attribute information is the specification of the car light, a specific type of the car light, and left and right sides of the car light. The type of the car lights includes a tail lamp, a left tail lamp, a right tail lamp, and a headlight.

At S202, the target preset image including the preset object of which attribute matches the attribute information of the object to be replaced is searched for in the preset image library.

In some possible implementations, a preset object of which attribute information is the same as the attribute information of the object to be replaced is first searched. Then, the target preset image including the preset object is searched in the preset image library.

At S203, the searched target preset image is determined as the replacement image.

In some possible implementations, the operation state of the preset object in the replacement image matches the scene information. In a specific example, if the object to be replaced is the left tail lamp and right tail lamp, the target preset image including the tail lamp that has the same attribute information as the left and right tail lamps and is in the illuminated state is searched in the preset image library. Since the left tail lamp and the right tail lamp have the same appearance and shape, the determined target preset image may be a frame image, or may be two symmetrical images identical to the left tail lamp and the right tail lamp, respectively. If the target preset image is a frame image, when the region occupied by the object to be replaced is replaced with the target preset image, replacement is separately performed by using the target preset image according to the shapes of the left and right tail lamps, so that the left and right tail lamps in the replaced target image are still symmetrical. Likewise, if the object to be replaced is the headlight or the tail lamp, when the region occupied by the object to be replaced is replaced with the target preset image, whether it is the headlight or the tail lamp is determined by means of position information of the object to be replaced, so that the replaced target image is more rational and realistic.

In the first manner, in response to the object to be replaced being the illumination lamp in the target object whose operation state does not match the scene information, the searching for the target preset image in the preset image library may be implemented by the following processes.

First, a distance between the object to be replaced and a device collecting the original image is determined.

In some embodiments, the image to be processed is obtained by converting the original image. That is, the image to be processed is obtained by performing image conversion on the original image. For example, the original image is a street image collected under the daytime scene, and the daytime scene is converted into the night scene to obtain the image to be processed. A size of the object to be replaced is first determined. Then, the distance may be calculated on the basis of the size, the number of pixels occupied by the object to be replaced in the image to be processed, and a focal distance of the device collecting the original image.

In a possible implementation, the size information of the object to be replaced is determined according to category information of the object to be replaced. The distance between the device collecting the original image and the object to be replaced is determined according to the size information of the object to be replaced and a size of the object to be replaced in the image to be processed.

In some possible implementations, the size information of the object to be replaced includes a length, width and height of the object to be replaced. The category information of the object to be replaced includes a brand or type of the object to be replaced. For example, the target object is a traveling device, the category information of the target object includes a car, a Suburban Utility Vehicle (SUV), a van, a small truck, a giant truck, a motor bus, a bus or a motor van. Then the object to be replaced is the car lights of the car, the SUV, the van, the small truck, the giant truck, the motor bus, the bus or the motor van of which operation state does not match the scene information of the specific scene. If the target object is a fixed lighting device, and the category information of the target object includes various types of street lights, construction site lights, searchlights, architectural lights, marine lights or civil lights, then the object to be replaced is the lamps in the various types of street lights, the construction site lights, the searchlights, the architectural lights, the marine lights or the civil lights of which operation states do not match the scene information of the specific scene.

After the category information of the object to be replaced is determined, the specification of the target object may be determined, so that the size information of the target object is obtained. For example, the category information of the target object is determined as the van, and it is further determined which type and specification of the van is, so that a width of the van is obtained. By using the target object being a van as an example, after a true width of the van is determined, the number of corresponding pixels of the true width of the object to be replaced (that is, the car lights of the van) in the image to be processed can be determined. Then, in combination with the focal distance of the image collection device (for example, the focal distance of the camera), the distance between the image collection device and the object to be replaced is estimated by means of the quotient of the number of the pixels and the focal distance.

Then, according to category information of the object to be replaced and the determined distance, the target preset image comprising the preset object of which attribute matches the attribute information of the object to be replaced is searched for in preset image library.

In some embodiments, for the objects to be replaced of different categories, operation parameters of the objects to be replaced are different at different distances. Therefore, by combining a category of the object to be replaced and the distance between the image collection device and the object to be replaced, the accuracy of searching the target preset image can be enhanced by searching for the target preset image in the preset image library. For example, if the target object is a fixed lighting device, and the object to be replaced is illumination lamps on the fixed lighting device, or if the target object is a traveling device, and the object to be replaced is illumination lamps on the traveling device, the distances between the image collection device and the illumination lamps is different, and the light intensities of the illumination lamps are different from each other accordingly. On the basis of a light intensity at a distance, an illumination lamp having the same light intensity is searched in the preset image library, and then the target preset image having the illumination lamp is used as the replacement image.

Second manner: in response to the target preset image not being searched in the preset image library, the target preset image including the preset object of which attribute matches the attribute information of the object to be replaced may be generated; the generated target preset image is determined as the replacement image; and the preset image library is updated on the basis of the generated target preset image. This manner may be implemented by the following processes.

First, a distance between the object to be replaced and a device collecting the original image is determined.

In some embodiments, if the target object is the traveling device, the determined distance is a distance between the at least one illumination lamp of the traveling device and the device collecting the original image. For example, the traveling device is a vehicle, the determined distance is a distance (or distances) between the car light(s) of the vehicle and the image collection device.

Then, the operation parameter of the preset object is determined according to the distance between the object to be replaced and the device collecting the original image.

In some embodiments, the operation parameter of the preset object includes various parameters of the preset object during normal operation. The category of the parameters corresponds to the category of the preset object, and includes operation power and operation intensity of the preset object. For example, if the preset object is an illumination lamp (e.g., an illumination lamp of the traveling device or an illumination lamp of the fixed lighting device), the operation parameter of the illumination lamp includes at least the light intensity of the illumination lamp. In addition, if the distance is different, the light intensity of the illumination lamp is different; if the distance is larger, the light intensity of the illumination lamp is weaker, that is, the operation parameter is smaller.

Further, the target preset image including the preset object is generated according to the determined operation parameter.

In some embodiments, after the operation parameter of the preset object is determined, the target preset image including an object in the operation state corresponding to the operation parameter may be generated according to the operation parameter, so as to obtain the replacement image. In a specific example, if the preset object is an illumination lamp, and the operation parameter is the light intensity of the illumination lamp, then the replacement image of the object to be replaced having the light intensity is generated according to the light intensity. Herein, after the light intensity at the distance is determined, the replacement image for the object to be replaced having the light intensity may be generated. After the replacement image is determined, the replacement image and the correspondence between the replacement image and the distance may be stored in the preset image library, so as to obtain the updated preset image library.

Further, the region occupied by the object to be replaced is replaced with the target preset image to generate the target image.

In some possible implementations, after the replacement image is generated, the size of the region occupied by the object to be replaced in the image to be processed is first determined. Then a size of the replacement image is adjusted on the basis of the size of the region, so that the adjusted replacement image matches the size of the region occupied by the object to be replaced. Therefore, by using the adjusted replacement image to replace the image of the region occupied by the object to be replaced, the generated target image can be higher in quality. In a specific example, if the image to be processed is a road image under the night scene, the target object is a vehicle traveling on the road, and the object to be replaced is the unilluminated car light(s) in the target object, for example, the unilluminated tail lamps of the vehicle in a night scene image. On the basis of a distance between the image collection device and the illumination lamp of the target object, the replacement image of the car light having a light intensity matching the distance is generated, and the replacement image is used to replace the tail lamps in the image to be processed. In this way, by replacing an illuminated car light image in a night image to be processed with a luminous replacement image, the generated target image can be more realistic.

Finally, the target preset image is stored in the preset image library.

In some embodiments, by determining the category information of the object to be replaced, the size of the object to be replaced is determined, so that the distance between the object to be replaced and the image collection device can be determined. Based on this, according to the correspondence between the distance and the operation parameter of the preset object, an operation parameter matching the distance may be determined from the correspondence table, so that the target preset image including the object in an operation state corresponding to the operation parameter is generated. Finally, the correspondence between the distance and the operation parameter, the correspondence between the category information and the size information of the object to be replaced, and the generated target preset image are all stored in the preset image library, so as to update the preset image library. Therefore, when the target preset image is required to be searched from the preset image library again, richer preset objects can be provided for selection, thereby enhancing the accuracy of the selected target preset image.

In some possible implementations, if the target object is the traveling device or the fixed lighting device, the preset object is an illumination lamp on the fixed lighting device or an illumination lamp on the traveling device, and the operation parameter of the preset object is the light intensity of the illumination lamp. A process of generating the target preset image including the preset object by determining the operation parameter of the preset object may be implemented by the following steps.

At a first step, the light intensity of the illumination lamp in a turned-on state is determined.

In some embodiments, the illumination lamp may be an illumination lamp of any specification, for example, a street lamp with small power or a searchlight with large power, then the light intensity of the illumination lamp in the turned-on state is determined.

At a second step, the light intensity of the illumination lamp matching the distance between the object to be replaced and the image collection device is determined according to the distance and the light intensity of the illumination lamp in the turned-on state.

In some embodiments, a correspondence between light intensities of illumination lamps in the turned-on state and distances is first determined. Then, the light intensities of an illumination lamp at different distances are determined on the basis of the correspondence. The correspondence between the light intensities and the distances is that, if the distance is larger, the light intensity is smaller. In other words, due to different distances between the image collection device and the object to be replaced, the collected light intensity of the object to be replaced is different. The light intensity is inversely proportional to the distance. That is to say, if the distance between the image collection device and the object to be replaced is larger, the collected light intensity of the object to be replaced is smaller. In this way, by measuring a plurality of distances and light intensities, the correspondence table characterizing the correspondence between the light intensities and the distances may be created. When a light parameter of the illumination lamp is required to be determined on the basis of the distance, the light intensity matching the distance may be searched from the table.

At a third step, according to the light intensity matching the distance, the target preset image including the preset object that has a light intensity matching the distance is generated.

In some embodiments, according to the light intensity, the image including the preset object with the light intensity is rendered and generated, i.e., the target preset image is generated.

In the first and second manner, "determination of the replacement image including the object to be replaced of which operation state matches the scene information" is implemented. In addition, the attribute information of the object to be replaced may be determined by means of the second neural network, and the target preset image including the preset object having the same attribute information is searched in the preset image library. If the target preset image cannot be searched in the preset image library, by comprehensively considering the category information of the object to be replaced and the distance between the device and the image collection device, the operation parameter of the preset object matching the distance is determined. In this way, the target preset image including the preset object that has the operation parameter is generated, and the preset image library is updated by storing the target preset image in the preset image library. Therefore, the matching degree between the finally obtained replacement object and the scene information can be increased.

In some embodiments, the above process of determining the replacement image may be implemented by means of a neural network. The neural network includes a first neural network and a second neural network. The category information of the target object is determined by means of the first neural network. By means of the second neural network, the illumination lamp in the target object of which operation state does not match the scene information is determined according to the category information, so that the object to be replaced may be obtained. An implementation process includes the following.

The target object in the image to be processed is detected by means of the first neural network.

In some possible implementations, the first neural network may be any type of neural networks, such as a convolutional neural network, a residual network, or the like. The image to be processed is inputted into the trained first neural network, and then the first neural network outputs a detection box and category of the target object.

In some embodiments, a training process of the first neural network may be implemented by the following steps.

At a first step, a training image is inputted into a first neural network to be trained, and first position information of the target object in an image to be trained is predicted.

In some possible implementations, the first neural network to be trained is trained by means of a large number of training images. That is to say, the large number of training images are inputted into the first neural network to be trained, to predict the position and category of the target object in the image to be trained.

At a second step, according to label position information of the target object in the training image, a first prediction loss of the first position information is determined.

In some possible implementations, by using a difference between the label position information of the target object in the training image and the first position information of the target object, the first prediction loss is determined.

At a third step, according to the first prediction loss, a network parameter of the first neural network to be trained is adjusted to obtain the first neural network.

In some possible implementations, the accuracy of each of the predicted first position information is determined by combining the label position information of the target object. The accuracy is fed back to the neural network to cause the neural network to adjust the network parameter such as a weight parameter, so that the accuracy of neural network detection can be enhanced. The first prediction loss is a cross entropy loss of a positive sample and a negative sample. By using the prediction loss to adjust the parameter of the neural network such as weight, a prediction result of the adjusted neural network can be more accurate.

The above is a process of training the first neural network. A plurality of iterations are performed on the basis of prediction positions of the target object and label positions of the target object, so that the first prediction loss of the first position information outputted by the trained first neural network meets a convergence condition, and thus the accuracy of the target object detected by the first neural network can be higher.

On the basis of the training process of the first neural network, a process of determining the object to be replaced in the target object includes the following.

First, the category information of the target object is determined by means of the first neural network.

In some possible implementations, after the category information of the target object is predicted by means of the first neural network, the category information is inputted into the second neural network.

Then, the object to be replaced in the target object is determined according to the category information by means of the second neural network.

In some possible implementations, the second neural network may be a trained network used to predict the object to be replaced in the target object. The trained network may be any type of neural network. By inputting the category information of the target object into the second neural network, the object to be replaced in the target object that is associated with the scene information of the specific scene may be predicted.

In some embodiments, a training process of the second neural network may be implemented by the following steps.

At a first step, the category information of the target object in the training image is labeled to obtain a labeled training image.

At a second step, the labeled training image is inputted into a second neural network to be trained, and second position information of the object to be replaced in the target object is predicted according to the labeled category information.

In some possible implementations, the second neural network to be trained is used to predict a position where the object to be replaced is located in the target object. The labeled training image is inputted into the second neural network to be trained, so as to predict and obtain the second position information of the object to be replaced, i.e., the position of the object to be replaced in the target object.

At a third step, according to the label position information of the object to be replaced in the target object, a second prediction loss is determined for the second position information.

The second prediction loss may be a loss function of which type is the same as that of the first prediction loss, for example, a cross entropy loss function.

At a fourth step, according to the second prediction loss, a network parameter of the second neural network to be trained is adjusted to obtain the second neural network.

In some possible implementations, the network parameter of the second neural network to be trained includes a neuron weight in the neural network, etc. By using the second prediction loss to adjust the parameter of the second neural network such as weight, a prediction result of the adjusted second neural network can be more accurate.

The above is a process of training the second neural network. A plurality of iterations are performed on the basis of the category information of the target object, so that the second prediction loss of the predicted position information of the object to be replaced outputted by the trained second neural network meets the convergence condition, and thus the accuracy of the object to be replaced outputted by the second neural network can be higher.

In some embodiments, replacing the image of the region occupied by the object to be replaced in the image to be processed with the replacement image to generate a target image may be implemented by the following processes.

First, size information of the replacement image is determined.

Next, an area of the region occupied by the object to be replaced in the image to be processed is determined.

In some possible implementations, a detection box of the object to be replaced is outputted by means of the first neural network, and the area of the detection box may be used as the area of the region occupied by the object to be replaced in the image to be processed.

Then, the size information of the replacement image is adjusted according to the area, to obtain an adjusted image.

In some possible implementations, according to the area of the region occupied by the object to be replaced in the image to be processed, the size information of the replacement image is adjusted to obtain the adjusted image, so that the size information of the adjusted image matches the size of the region.

Then, the image of the region occupied by the object to be replaced is replaced with the adjusted image to generate a candidate image.

In some possible implementations, the image of the region occupied by the object to be replaced in the image to be processed is replaced with the adjusted image, to obtain a replaced image, i.e., a candidate image. In a specific example, if the scene information of the specific scene is a night scene, the image to be processed is a road image including the night scene, and the object to be replaced is the car light(s) of which operation state does not match the night scene, i.e., the car light(s) in the unilluminated state, it indicates that a representation of the car light(s) in the image is not rational, then the target preset image (i.e., the replacement image searched from the preset image library) is the image including the car light(s) in the illuminated state. By adjusting the size of the target preset image, the adjusted image may be obtained, and the image of the region occupied by the object to be replaced is replaced with the adjusted image, so as to generate the target image including the car light(s) in the illuminated state.

Finally, the candidate image is smoothed to generate the target image.

In some possible implementations, a region where a replacement operation occurs in the candidate image may be smoothed to eliminate noise of the image in the region, or the whole candidate image may be smoothed to reduce the noise of the whole image, so as to obtain the target image. Therefore, the generated target image can be more rational and clear.

An exemplary application of the embodiment of the disclosure in an actual application scene is described below. For example, the road image collected under the daytime scene is converted into that under the night scene. That is, the specific scene is the night scene, the image to be processed is an image to be processed at night, the target object is vehicles, and the object to be replaced is car lights.

An embodiment of the disclosure provides a method for adding a tail lamp in a night scene based on image generation, target detection and tail lamp matching, which enables the vehicles in the generated night image to be more realistic. The embodiment of the disclosure may be applied to more fields of image generation. For example, adding the headlights of the vehicles, the street lamps and the like in the night scene makes the generated tail lamp in the generated image more real.

Figure 3A:
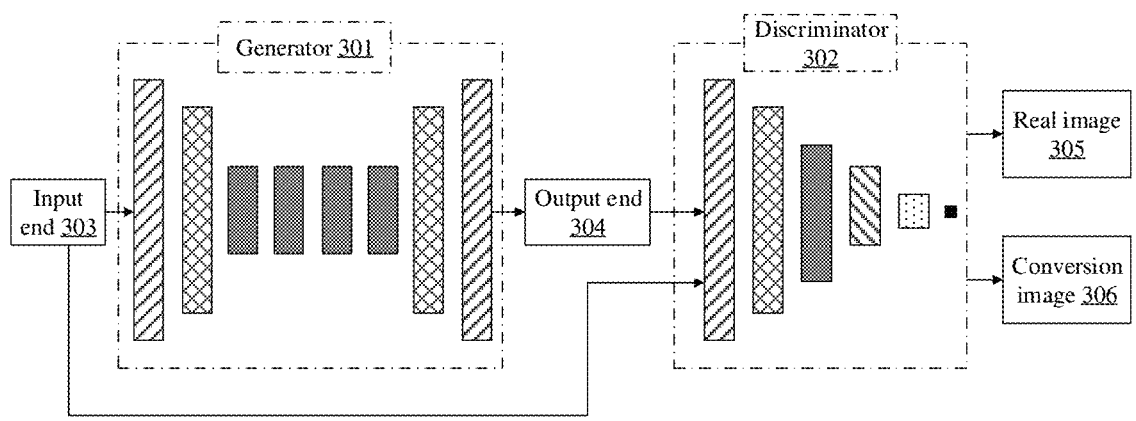
FIG. 3A is a schematic diagram of a composition structure of an image generation system according to an embodiment of the disclosure.

FIG. 3A is a schematic diagram of a composition structure of an image generation system (which is configured to generate an image to be processed) according to an embodiment of the disclosure. The following description is made with reference to FIG. 3A.

The image generation system provided in the embodiment of the disclosure includes a generator 301 and a discriminator 302. First, a daytime image to be processed (corresponding to the original image in the above embodiments, for example, the daytime image 321 to be processed in FIG. 3B) is used as an input, and is inputted into the generator 301 from an input end 303.

Figure 3B:
FIG. 3B is a schematic diagram of an application scene of an image generation method according to an embodiment of the disclosure.

Next, the generator 301 is used to generate a night scene image (corresponding to the image to be processed in the above embodiments, for example, the night scene image 322 in FIG. 3B), and the generated night scene image is outputted to the discriminator 302 through an output end 304.

In some possible implementations, the night scene image collected under the night scene and the generated night scene image are both inputted into the discriminator 302.

Then, the discriminator 302 is used to distinguish whether the night scene image is from a real night scene image or the generated night scene image. That is, a real image 305 and a conversion image 306 are respectively obtained.

Finally, by continuously optimizing the loss functions of the generator and the discriminator, the night scene generated by the generator can be more real.

Figure 4:
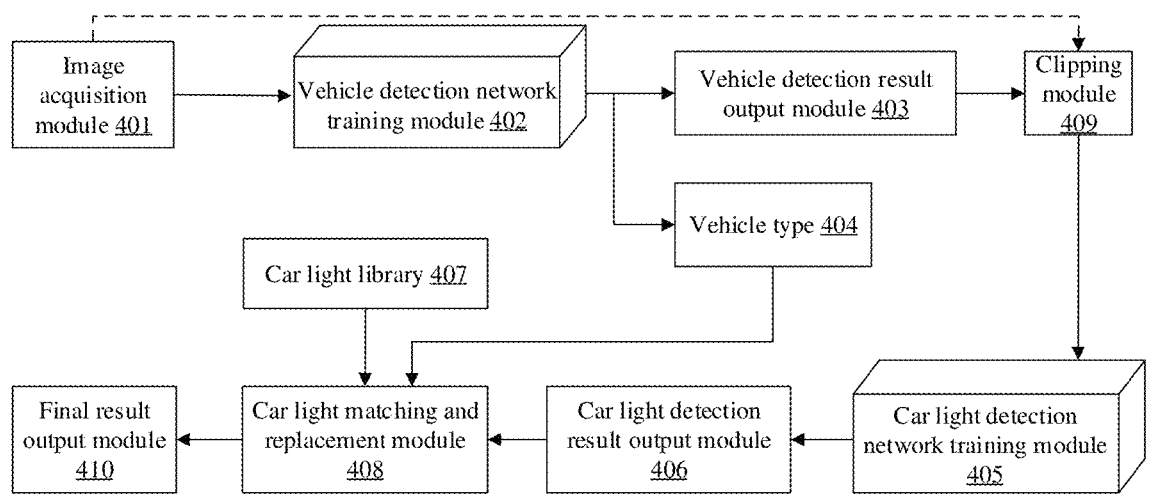
FIG. 4 is a structural diagram of an implementation framework of an image generation method according to an embodiment of the disclosure.

In some embodiments, after night scene data is generated by the image generation system shown in FIG. 3B, fine-grained target detection labeling is performed on vehicles in the image. That is to say, the vehicles in the image is framed by using a rectangular box, and category information (for example, a car, an off-road vehicle, a van, a small truck, a giant truck, a motor bus, a bus, a motor van, or the like) of each vehicle is labeled. In addition, for each vehicle, tail lamps (corresponding to the object to be replaced in the above embodiments) of each vehicle is labeled, that is, positions of the tail lamps are labeled by using the rectangular box. Furthermore, according to different types of the vehicles, car lights in the real night scene are collected. That is to say, regions, where car lights are turned on, in the collected vehicle image under the night scene are cutout, to form an image library (corresponding to the preset image library in the above embodiment) including car light data, for subsequently matching the object to be replaced, so as to obtain the tail lamp (corresponding to the preset object matching the object to be replaced in the above embodiment) matching the object to be replaced. A process of matching the tail lamps is shown in FIG. 4. FIG. 4 is a structural diagram of an implementation framework of an image generation method according to an embodiment of the disclosure. Details are described below with reference to FIG. 4.

An image acquisition module 401 is configured to perform target detection on the original image, and label a target by using a label box.

A vehicle detection network training module 402 is configured to classify the vehicles using the label box to train a corresponding detection network, so as to obtain a vehicle detection network (corresponding to the first neural network in the above embodiment).

A vehicle detection result module 403 is configured to detect the original image by means of the vehicle detection network, to obtain a vehicle detection result (for example, obtaining coordinates of top left corner and lower right corner (i.e., the rectangular boxes labeling the regions where the vehicles are located) of the vehicle in an image coordinate system), and obtain a category of the detected vehicle, that is, a vehicle type 404, so as to prepare for car light matching during image generation.

A clipping module 409 is configured to clip a position corresponding to the rectangular box from the original image on the basis of the rectangular box used for detecting the vehicle in the vehicle detection result, and determine car light information of the vehicle in the rectangular box.

A car light detection network training module 405 is configured to train a car light detection network (corresponding to the second neural network in the above embodiment) according to the car light information of the vehicle in the rectangular box.

A car light detection result output module 406 is configured to detect the car light in the original image by means of the car light detection network, to obtain a car light detection result.

In some embodiments, the car light detection result includes a position of a respective car light of the vehicle and a size of the car light. In this embodiment of the disclosure, the car light detection network is not limited as a specific network.

A car light matching and replacement module 408 is configured to, after the position and size of the respective car light of the vehicle in the original image and a refined category corresponding to the vehicle are detected, perform car light matching and replacement on the tail lamp in the original image by using a sample tail lamp image matching the tail lamp in the original image that is searched in a car light library 407.

In some embodiments, by means of an image matching method, a sample tail lamp of the vehicle with the corresponding category under the night scene is searched in the corresponding car light library 407, and the size of the tail lamp is adjusted to obtain a sample tail lamp image (that is, the target preset image matching the tail lamp of the vehicle), which includes a sample tail lamp of which size is the same as that of the tail lamp of the vehicle.

A final result output module 410 is configured to replace the region where the tail lamp is located in the original image with the sample tail lamp image, and to smooth surrounding images of the replaced tail lamp region by using a smoothing technology, so as to obtain the target image, that is, a final image result of the tail lamp that is illuminated at night.

Figure 5:
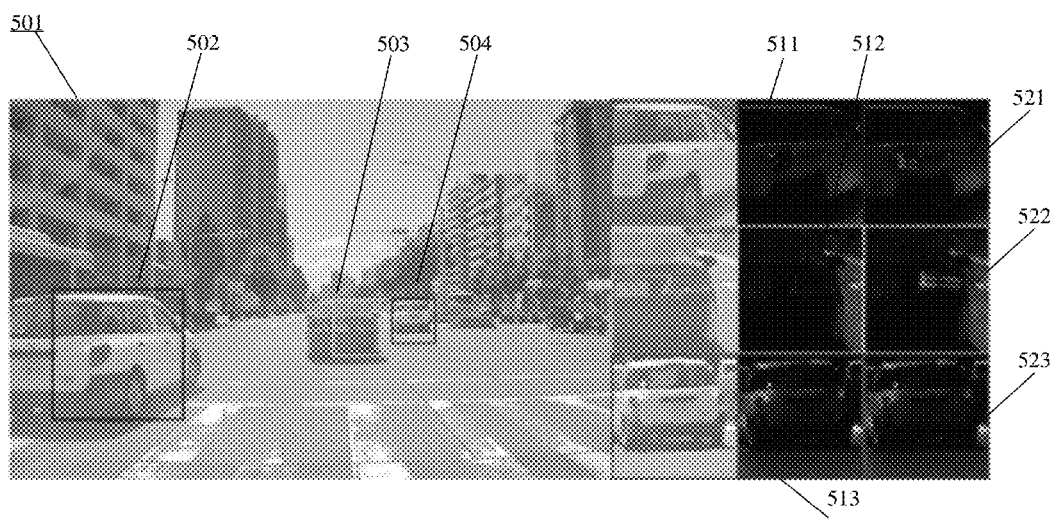
FIG. 5 is a schematic diagram of another application scene of an image generation method according to an embodiment of the disclosure.

In some embodiments, an image obtained after the tail lamp in the original image is replace with the tail lamp image in the car light library is shown in FIG. 5. FIG. 5 is a schematic diagram of another application scene of an image generation method according to an embodiment of the disclosure. The original image 501 (corresponding to the original image in the above embodiment) is an image collected under a daytime scene. A generation process of the target image includes the following.

First, target detection is performed on the original image 501, and vehicles 502, 503 and 504 are labeled by using rectangular boxes.

Then, regions (that is, the vehicles 502, 503 and 504) labeled by the rectangular boxes are cutout and amplified, and converted into night scene images, to successively obtain night scene images 511, 512 and 513 (corresponding to the image to be processed in the above embodiment).

Finally, sample tail lamp images including sample tail lamps matching the tail lamps in the night scene images 511, 512 and 513 are determined from the preset image library; and regions where the tail lamps are located in the night scene images 511, 512 and 513 are replaced with the sample tail lamp images, to successively obtain night scene images 521, 522 and 523 in which illuminated tail lamps, i.e., the target images are added.

In the embodiment of the disclosure, vehicle types are first finely classified during vehicle detection. Then, tail lamp detection is performed by means of the vehicle detection result to obtain the position and size of the tail lamp. Finally, according to the classification result of vehicle types and the position and size of the tail lamp, the sample tail lamp is matched in the tail lamp library, so as to obtain a final image with tail lamps. In this way, the addition of the tail lamps can be more natural, and the tail lamps of the vehicle can be more in line with the authenticity of the night scene by lighting up the tail lamps of the vehicle when the image under the daytime scene is converted into the night scene image.

Figure 6:
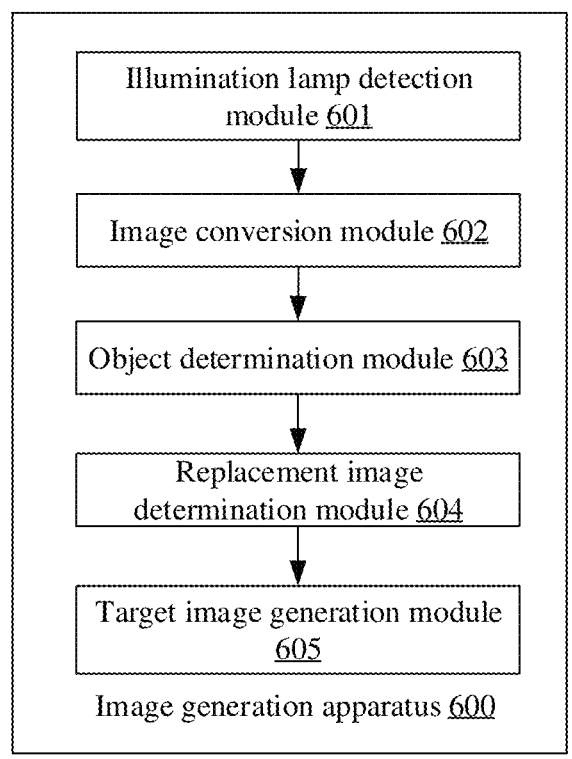
FIG. 6 is a schematic diagram of a structure composition of an image generation apparatus according to an embodiment of the disclosure.

An embodiment of the disclosure provides an image generation apparatus. FIG. 6 is a schematic diagram of a structure composition of an apparatus of image generation according to an embodiment of the disclosure. As shown in FIG. 6, the apparatus 600 includes an illumination lamp detection module 601, an image conversion module 602, an object determination module 603, a replacement image determination module 604, and a target image generation module 605.

The illumination lamp detection module 601 is configured to detect illumination lamps on a target object in an original image.

The image conversion module 602 is configured to convert the original image into an image to be processed that is under a specific scene.

The object determination module 603 is configured to determine, in the image to be processed, at least one illumination lamp of which operation state does not match scene information of the specific scene as an object to be replaced.

The replacement image determination module 604 is configured to determine, according to the scene information and the object to be replaced, a replacement image comprising the object to be replaced of which operation state matches the scene information.

The target image generation module 605 is configured to replace an image of a region occupied by the object to be replaced in the image to be processed with the replacement image to generate a target image.

In the above apparatus, the replacement image determination module 604 includes an attribute determination sub-module, a target preset image searching sub-module, and a replacement image determination sub-module.

The attribute determination sub-module is configured to determine attribute information of the object to be replaced.

The target preset image searching sub-module is configured to search a preset image library for a target preset image including a preset object of which attribute matches the attribute information of the object to be replaced.

The replacement image determination sub-module is configured to determine the searched target preset image as the replacement image. An operation state of the preset object in the replacement image matches the scene information.

The apparatus further includes a distance determination module.

The distance determination module is configured to determine a distance between the object to be replaced and a device collecting the original image.

The target preset image searching sub-module is further configured to:
  search, according to category information of the object to be replaced and the determined distance, the preset image library for the target preset image including the preset object of which attribute matches the attribute information of the object to be replaced.

In the above apparatus, in response to the target preset image not being searched in the preset image library, the apparatus further includes a target preset image generation module.

The target preset image generation module is configured to generate the target preset image including the preset object of which attribute matches the attribute information of the object to be replaced; and determine the generated target preset image as the replacement image.

In the above apparatus, the target preset image generation module includes an operation parameter determination sub-module and a target preset image generation sub-module.

The operation parameter determination sub-module is configured to determine an operation parameter of the preset object according to the distance between the object to be replaced and the device collecting the original image.

The target preset image generation sub-module is configured to generate the target preset image including the preset object according to the determined operation parameter.

In the above apparatus, the distance determination module further includes a first size information determination sub-module and a distance determination sub-module.

The first size information determination sub-module is configured to determine size information of the object to be replaced according to the category information of the object to be replaced.

The distance determination sub-module is configured to determine the distance between the device collecting the original image and the object to be replaced according to the size information and a size of the object to be replaced in the image to be processed.

In the above apparatus, the apparatus further includes an image library updating module.

The image library updating module is configured to store the target preset image in the preset image library after the target preset image is generated.

In the above apparatus, the operation parameter of the preset object is light intensity of the illumination lamp.

The operation parameter determination sub-module includes: a first light intensity determination unit, configured to determine the light intensity of the illumination lamp at a turned-on state; and a second light intensity determination unit, configured to determine, according to the distance and the light intensity of the illumination lamp at the turned-on state, the light intensity of the illumination lamp matching the distance.

The target preset image generation sub-module is further configured to generate, according to the light intensity matching the distance, the target preset image including the preset object with the light intensity matching the distance.

In the above apparatus, the image generation module 605 includes a second size information determination sub-module, an area determination sub-module, a replacement image adjustment sub-module, a candidate image generation sub-module, and a target image generation sub-module.

The second size information determination sub-module is configured to determine size information of the replacement image.

The area determination sub-module is configured to determine an area of a region of the object to be replaced occupied by the image to be processed.

The replacement image adjustment sub-module is configured to adjust the size information of the replacement image according to the area to obtain an adjusted image.

The candidate image generation sub-module is configured to replace the image of the region occupied by the object to be replaced with the adjusted image to generate a candidate image.

The target image generation sub-module is configured to smooth the candidate image to generate the target image.

In the above apparatus, the target object includes a traveling device and a street lamp.

It is to be noted that, the descriptions of the above apparatus embodiments are similar to descriptions about the method embodiments and beneficial effects similar to those of the method embodiments are achieved. For technical details that are not disclosed in the apparatus embodiments of the present disclosure, reference is made to the descriptions of the method embodiments of the present disclosure for understanding.

It is to be noted that in the embodiments of the present disclosure, if the above image generation method is implemented in the form of software functional module and sold or used as an independent product, it can be stored in the computer-readable storage medium. Based on such an understanding, the technical solutions of the present disclosure substantially or parts making contributions to some implementations may be embodied in form of a software product, and the computer software product is stored in a storage medium, including a plurality of instructions for causing a computer device (which may be a terminal, a server, or the like) to execute all or part of the method in each embodiment of the present disclosure. The foregoing storage medium includes: a USB flash disk, a mobile Hard Disk Drive (HDD), a Read-Only Memory (ROM), and various media that can store program codes, such as a magnetic disk, or an optical disk. In this way, the embodiments of the present disclosure are not limited to any specific combination of hardware and software.

Figure 7:
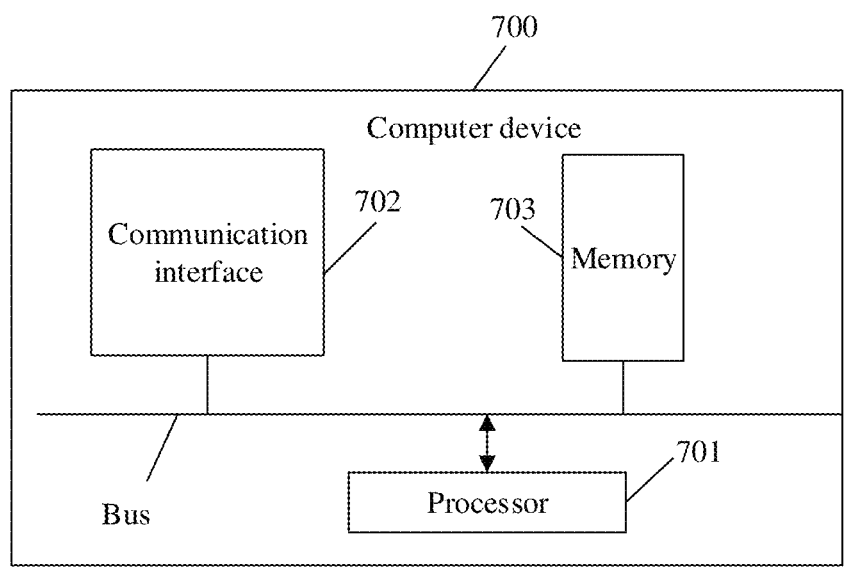
FIG. 7 is a schematic diagram of a composition structure of a computer device according to an embodiment of the disclosure.

Accordingly, an embodiment of the disclosure further provides a computer storage medium. The computer storage medium includes a computer executable instruction that, after being executed, enables to implement the steps in the image generation method provided in the embodiments of the disclosure. Correspondingly, an embodiment of the disclosure further provides a computer storage medium. The computer storage medium stores a computer executable instruction that, when executed by a processor, implements the steps of the image generation method provided in the above embodiments. Correspondingly, an embodiment of the disclosure provides a computer device. FIG. 7 is a schematic diagram of a composition structure of a computer device according to an embodiment of the disclosure. As shown in FIG. 7, the computer device 700 includes a processor 701, at least one communication bus, a communication interface 702, at least one external communication interface, and a memory 703. The communication interface 702 is configured to achieve connection communication between these assemblies. The communication interface 702 may include a display screen. The external communication interface may include a standard wired interface and wireless interface. The processor 701 is configured to execute an image processing program in the memory to implement the image generation method provided in the above embodiments.

The embodiments of the disclosure provide a method and an apparatus of image generation, a device and a storage medium. The original image is first converted into the image to be processed that is under the specific scene. Then, the illumination lamp that is on the target object in the image to be processed and has an operation state not matching the scene information of the specific scene is used as the object to be replaced, and the replacement image including the object to be replaced of which operation state matches the scene information is determined according to the scene information and the object to be replaced. Finally, the replacement image is used to replace the image of the region occupied by the object to be replaced in the image to be processed, to generate the target image. In this way, the operation state of the object in the target image can match the scene information, so that the generated target image can be more in line with a real scene.

The above descriptions of the image generation apparatus, computer device and storage medium embodiments are similar to the descriptions of the above method embodiments, and have similar technical descriptions and beneficial effects to the corresponding method embodiments. Due to space limitations, the description of the above method embodiments can be used, which is not described herein again. For technical details that are not disclosed in the image generation apparatus, the computer device and the storage medium embodiments of the disclosure, reference can be made to the descriptions of the method embodiments of the disclosure for understanding. It is to be understood that "one embodiment" and "an embodiment" mentioned in the whole specification mean that specific features, structures or characteristics related to the embodiment is included in at least one embodiment of the disclosure. Therefore, "in one embodiment" or "in an embodiment" appearing at any place of the whole specification does not always refer to the same embodiment. In addition, these specific features, structures or characteristics may be combined in one or more embodiments in any proper manner. It is to be understood that, in various embodiments of the disclosure, the sequence number of each process does not mean the sequence of execution. The execution sequence of each process should be determined by its functions and internal logic, which should not constitute any limitation on the implementation process of the embodiments of the disclosure. The serial numbers of the foregoing embodiments of the present disclosure are merely for description, and do not represent the superiority or inferiority of the embodiments.

It is to be noted that terms "include" and "comprise" or any other variant thereof is intended to cover nonexclusive inclusions herein, so that a process, method, object or apparatus including a series of components not only includes those components but also includes other components which are not clearly listed or further includes components intrinsic to the process, the method, the object or the apparatus. Under the condition of no more limitations, a component defined by the statement "including a/an . . . " does not exclude existence of the same other components in a process, method, object or apparatus including the component.

In several embodiments provided by the disclosure, it is to be understood that the disclosed device and method may be implemented in other ways. The device embodiment described above is only schematic, and for example, division of the units is only logic function division, and other division manners may be adopted during practical implementation. For example, a plurality of units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part of all of the units may be selected according to a practical requirement to achieve the purposes of the solutions of the embodiments. In addition, each functional unit in each embodiment of the disclosure may be integrated into a processing unit, each unit may also serve as an independent unit and two or more than two units may also be integrated into a unit. The integrated unit may be implemented in a hardware form and may also be implemented in form of hardware and software functional unit. Those of ordinary skill in the art should know that all or part of the steps of the method embodiment may be implemented by related hardware instructed through a program, the program may be stored in a computer-readable storage medium, and the program is executed to execute the steps of the method embodiments. The storage medium includes: a mobile storage device, an ROM, and various media that can store program codes, such as a magnetic disk, or an optical disk.

Or, if the integrated units of the present disclosure are implemented in the form of software functional units and sold or used as an independent product, it can be stored in the computer readable storage medium. Based on such an understanding, the technical solutions of the embodiments of the disclosure substantially or parts making contributions to some implementations may be embodied in form of a software product, and the computer software product is stored in a storage medium, including a plurality of instructions for causing a computer device (which may be a personal computer, a server, a network device or the like) to execute all or part of the method in each embodiment of the present disclosure. The foregoing storage medium includes a portable storage device, an ROM, and various media that can store program codes, such as a magnetic disk, or an optical disk. The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the protection scope of the disclosure shall be subject to the protection scope of the claims.

The embodiments of the disclosure provide an image generation method and apparatus, a device and a storage medium. Illumination lamps on the target object in the original image are detected; the original image is converted into the image to be processed that is under a specific scene; in the image to be processed, at least one illumination lamp of which operation state does not match scene information of the specific scene is determined as an object to be replaced; the replacement image including the object to be replaced of which operation state matches the scene information is determined according to the scene information and the object to be replaced; and an image of a region occupied by the object to be replaced in the image to be processed is replaced with the replacement image to generate the target image.

The invention claimed is:

1. A method of image generation, executed by an electronic device and comprising:
   detecting illumination lamps on a target object in an original image;
   converting the original image into an image to be processed that is under a specific scene;
   determining, in the image to be processed, at least one illumination lamp of which operation state does not match scene information of the specific scene as an object to be replaced;
   determining, according to the scene information and the object to be replaced, a replacement image comprising the object to be replaced of which operation state matches the scene information; and
   replacing an image of a region occupied by the object to be replaced in the image to be processed with the replacement image to generate a target image.

2. The method of claim 1, wherein determining, according to the scene information and the object to be replaced, the replacement image comprising the object to be replaced of which the operation state matches the scene information, comprises:

determining attribute information of the object to be replaced;

searching a preset image library for a target preset image comprising a preset object of which attribute matches the attribute information of the object to be replaced; and determining the searched target preset image as the replacement image, wherein an operation state of the preset object in the replacement image matches the scene information.

3. The method of claim 2, further comprising:

determining a distance between the object to be replaced and a device collecting the original image;

wherein searching the preset image library for the target preset image comprising the preset object of which the attribute matches the attribute information of the object to be replaced comprises:

searching, according to category information of the object to be replaced and the determined distance, the preset image library for the target preset image comprising the preset object of which the attribute matches the attribute information of the object to be replaced.

4. The method of claim 3, wherein determining the distance between the object to be replaced and the device collecting the original image comprises:

determining size information of the object to be replaced according to the category information of the object to be replaced; and determining the distance between the device collecting the original image and the object to be replaced according to the size information and a size of the object to be replaced in the image to be processed.

5. The method of claim 2, wherein in response to the target preset image not being searched in the preset image library, the method further comprises:

generating the target preset image comprising the preset object of which the attribute matches the attribute information of the object to be replaced; and determining the generated target preset image as the replacement image.

6. The method of claim 5, wherein generating the target preset image comprising the preset object of which the attribute matches the attribute information of the object to be replaced comprises:

determining an operation parameter of the preset object according to the distance between the object to be replaced and the device collecting the original image; and generating the target preset image comprising the preset object according to the determined operation parameter.

7. The method of claim 6, wherein the operation parameter of the preset object is light intensity of the illumination lamp;

wherein determining the operation parameter of the preset object according to the distance between the object to be replaced and the device collecting the original image comprises: determining the light intensity of the illumination lamp at a turned-on state; and determining the light intensity of the illumination lamp matching the distance according to the distance and the light intensity of the illumination lamp at the turned-on state, and wherein generating the target preset image comprising the preset object according to the determined operation parameter comprises: generating, according to the light intensity matching the distance, the target preset image comprising the preset object with the light intensity matching the distance.

8. The method of claim 5, wherein after the target preset image is generated, the method further comprises:

storing the target preset image in the preset image library.

9. The method of claim 1, wherein replacing the image of the region occupied by the object to be replaced in the image to be processed with the replacement image to generate the target image comprises:

determining size information of the replacement image;

determining an area of the region occupied by the object to be replaced in the image to be processed;

adjusting the size information of the replacement image according to the area to obtain an adjusted image; and replacing the image of the region occupied by the object to be replaced with the adjusted image to generate a candidate image; and smoothing the candidate image to generate the target image.

10. The method of claim 1, wherein the target object comprises a traveling device and a street lamp.

11. A non-transitory computer storage medium, having a computer executable instruction stored thereon, wherein the computer executable instruction, when being executed, enables to implement the following:

detecting illumination lamps on a target object in an original image;

converting the original image into an image to be processed that is under a specific scene;

determining, in the image to be processed, at least one illumination lamp of which operation state does not match scene information of the specific scene as an object to be replaced;

determining, according to the scene information and the object to be replaced, a replacement image comprising the object to be replaced of which operation state matches the scene information; and replacing an image of a region occupied by the object to be replaced in the image to be processed with the replacement image to generate a target image.

12. An electronic device, comprising a memory and a processor, wherein the memory stores a computer executable instruction; and the processor is configured to execute the computer executable instruction stored on the memory to:

detect illumination lamps on a target object in an original image;

convert the original image into an image to be processed that is under a specific scene;

determine, in the image to be processed, at least one illumination lamp of which operation state does not match scene information of the specific scene as an object to be replaced;

determine, according to the scene information and the object to be replaced, a replacement image comprising the object to be replaced of which operation state matches the scene information; and replace an image of a region occupied by the object to be replaced in the image to be processed with the replacement image to generate a target image.

13. The electronic device of claim 12, wherein the operation of determining, according to the scene information and the object to be replaced, the replacement image comprising the object to be replaced of which the operation state matches the scene information comprises:

determining attribute information of the object to be replaced;

searching a preset image library for a target preset image comprising a preset object of which attribute matches the attribute information of the object to be replaced; and determining the searched target preset image as the replacement image, wherein an operation state of the preset object in the replacement image matches the scene information.

14. The electronic device of claim 13, wherein the processor is further configured to execute the computer executable instruction stored on the memory to:

determine a distance between the object to be replaced and a device collecting the original image; and search, according to category information of the object to be replaced and the determined distance, the preset image library for the target preset image comprising the preset object of which the attribute matches the attribute information of the object to be replaced.

15. The electronic device of claim 14, wherein the operation of determining the distance between the object to be replaced and the device collecting the original image comprises:

determining size information of the object to be replaced according to the category information of the object to be replaced; and determining the distance between the device collecting the original image and the object to be replaced according to the size information and a size of the object to be replaced in the image to be processed.

16. The electronic device of claim 13, wherein the processor is further configured to execute the computer executable instruction stored on the memory to: in response to the target preset image not being searched in the preset image library, generate the target preset image comprising the preset object of which the attribute matches the attribute information of the object to be replaced; and determine the generated target preset image as the replacement image.

17. The electronic device of claim 16, wherein the operation of generating the target preset image comprising the preset object of which the attribute matches the attribute information of the object to be replaced comprises:

determining an operation parameter of the preset object according to the distance between the object to be replaced and the device collecting the original image; and generating the target preset image comprising the preset object according to the determined operation parameter.

18. The electronic device of claim 17, wherein the operation parameter of the preset object is light intensity of the illumination lamp;

wherein the operation of determining the operation parameter of the preset object according to the distance between the object to be replaced and the device collecting the original image comprises: determining the light intensity of the illumination lamp at a turned-on state; and determining the light intensity of the illumination lamp matching the distance according to the distance and the light intensity of the illumination lamp at the turned-on state, and wherein the operation of generating the target preset image comprising the preset object according to the determined operation parameter comprises: generating, according to the light intensity matching the distance, the target preset image comprising the preset object with the light intensity matching the distance.

19. The electronic device of claim 16, wherein the processor is further configured to execute the computer executable instruction stored on the memory to: after the target preset image is generated, store the target preset image in the preset image library.

20. The electronic device of claim 12, wherein the operation of replacing the image of the region occupied by the object to be replaced in the image to be processed with the replacement image to generate the target image comprises:

determining size information of the replacement image;

determining an area of the region occupied by the object to be replaced in the image to be processed;

adjusting the size information of the replacement image according to the area to obtain an adjusted image; and replacing the image of the region occupied by the object to be replaced with the adjusted image to generate a candidate image; and smoothing the candidate image to generate the target image.

* * * * *